(12) United States Patent
Singh et al.

(10) Patent No.: US 9,258,757 B1
(45) Date of Patent: Feb. 9, 2016

(54) DYNAMIC CONTROL OF TRANSMISSION OF REVERSE-LINK CONTROL SIGNALS

(75) Inventors: Jasinder P. Singh, Olathe, KS (US); Maulik K. Shah, Overland Park, KS (US); Deveshkumar N. Rai, Overland Park, KS (US); Sachin R. Vargantwar, Macon, GA (US)

(73) Assignee: Sprint Spectrum L.P., Overland Pak, KS (US)

( * ) Notice: Subject to any disclaimer, the term of this patent is extended or adjusted under 35 U.S.C. 154(b) by 359 days.

(21) Appl. No.: 13/597,680

(22) Filed: Aug. 29, 2012

(51) Int. Cl.
*H04W 4/00* (2009.01)
*H04W 36/30* (2009.01)
*H04W 84/04* (2009.01)

(52) U.S. Cl.
CPC .............. *H04W 36/30* (2013.01); *H04W 84/04* (2013.01)

(58) Field of Classification Search
CPC ............................. H04W 84/04; H04W 36/30
USPC .......................................... 370/328, 333, 431
See application file for complete search history.

(56) References Cited

U.S. PATENT DOCUMENTS

| | | | | |
|---|---|---|---|---|
| 6,564,060 | B1* | 5/2003 | Hoagland | 455/450 |
| 8,098,644 | B2* | 1/2012 | Xiao et al. | 370/344 |
| 8,339,964 | B2* | 12/2012 | Fodor et al. | 370/237 |
| 8,571,006 | B2* | 10/2013 | Harada et al. | 370/350 |
| 8,619,615 | B2* | 12/2013 | Aiba et al. | 370/252 |
| 2003/0179727 | A1* | 9/2003 | Soong et al. | 370/328 |
| 2007/0178930 | A1* | 8/2007 | Xiao et al. | 455/522 |
| 2010/0135273 | A1 | 6/2010 | Kim | |
| 2013/0100888 | A1* | 4/2013 | Shimezawa et al. | 370/328 |
| 2013/0208690 | A1* | 8/2013 | Nishikawa et al. | 370/329 |
| 2013/0229958 | A1* | 9/2013 | Sagae et al. | 370/281 |
| 2014/0036786 | A1* | 2/2014 | Kazmi et al. | 370/329 |

* cited by examiner

*Primary Examiner* — Phuc Tran

(57) ABSTRACT

A method and system for dynamically controlling the transmission of reverse-link control signals to help reduce interference on the reverse link. A RAN identifies a mobile device whose transmission of reverse-link control signals best represents the reverse-link air interface condition of each other mobile device in a plurality of mobile devices. Then the RAN causes each mobile device in the plurality other than the identified mobile device to not send its respective reverse-link control signal at a given time, thereby reducing the number of mobile devices that transmit reverse-link control signals at the given time.

20 Claims, 8 Drawing Sheets

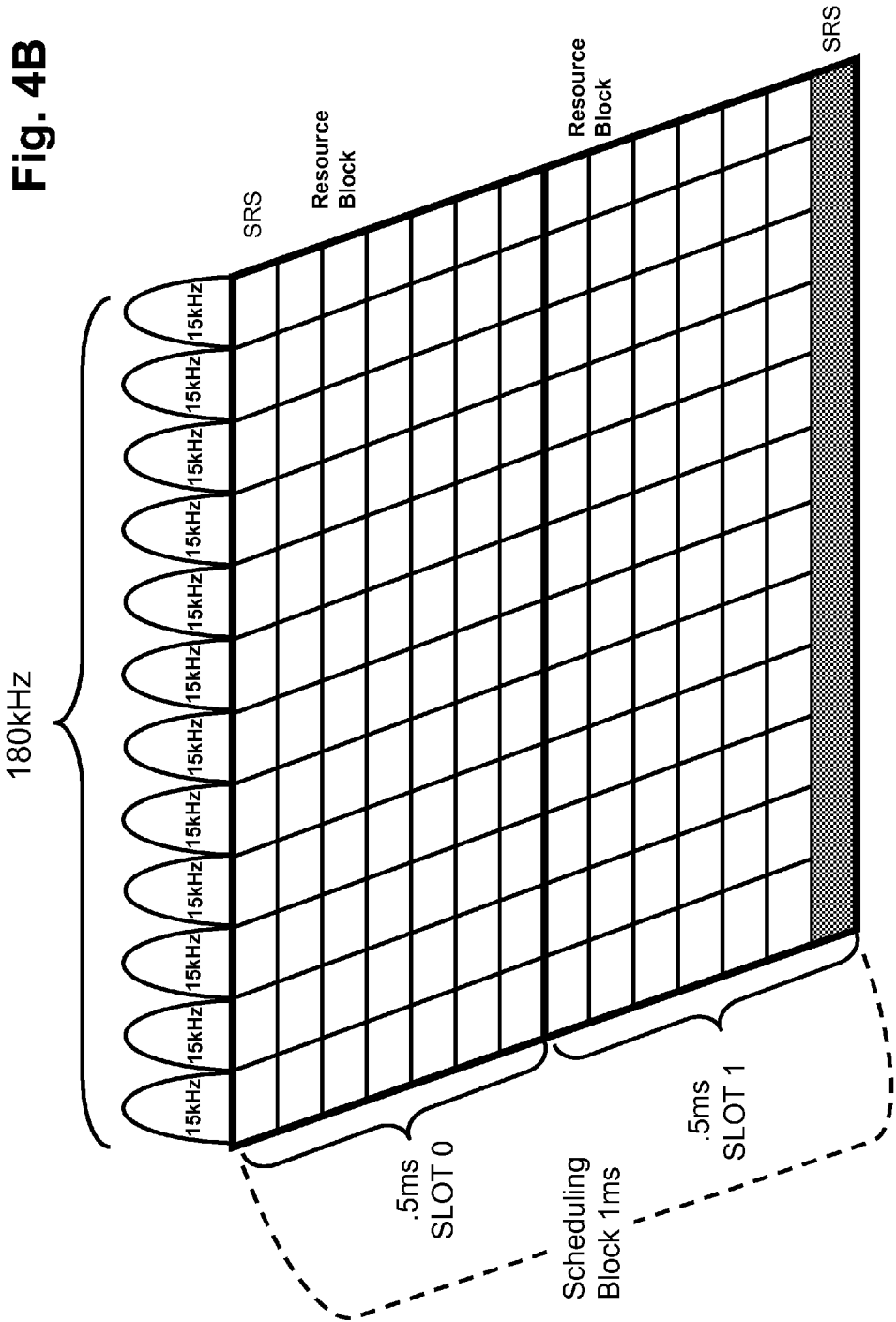

DYNAMIC CONTROL OF TRANSMISSION OF REVERSE-LINK CONTROL SIGNALS

BACKGROUND

Unless otherwise indicated herein, the materials described in this section are not prior art to the claims and are not admitted to be prior art by inclusion in this section.

Many people (or "subscribers") use mobile devices, such as wireless telephones, wireless e-mail devices, wirelessly-equipped computers (such as handheld, tablet, or laptop computers), or other types of wireless communication devices, to communicate with one or more Radio Access Networks (RANs). The RANs may include a number of network elements that communicate with one another via wired and/or wireless links and that thereby enable the mobile devices to communicate with one or more remote devices.

A typical RAN includes one or more base stations that radiate to provide wireless-communication service to mobile devices within a given geographical coverage area. Depending on the specific underlying technologies and architecture of a given wireless communication system, various RAN elements may take different forms. In a code division multiple access (CDMA) system configured to operate according to IS-2000 and IS-856 standards, for example, the base station is usually referred to as a base transceiver system (BTS). In a universal mobile telecommunications system (UMTS) configured to operate according to Long Term Evolution (LTE) standards, however, the base station is usually referred to as an eNodeB. Other examples exist as well.

In a CDMA system, the mobile device used by a subscriber is referred to as an access terminal (also referred to herein as "AT"); in an LTE system the mobile device is referred to as user equipment (also referred to herein as "UE"). When an AT or UE is positioned within the coverage area of a base station, it communicates via an RF air interface with the base station. The air interface may define a forward link (or "downlink") for carrying communications from the base station to the mobile device and a reverse link (or "uplink") for carrying communications from the mobile device to the base station. In various implementations, these links may be defined on one or more carrier frequencies, or blocks of frequencies having a given bandwidth. Furthermore, on each link, various channels may be defined through techniques such as time division multiplexing, code division multiplexing, and the like.

In one implementation, the forward link and/or reverse link may be divided over time into a sequence of timeslots, and the base station or associated equipment may be arranged to transmit data to, or receive data from, mobile devices during those timeslots. In such an implementation, the base station or associated equipment may dynamically schedule transmission of data in particular timeslots and may then transmit and/or receive the data according to that schedule. In addition to scheduling the transmission of data, the base station may determine (and allocate) the extent of other forward link and/or reverse link resources to be used by mobile devices for the transmission of data. Examples of such resources include a number of timeslots for transmission of the data, a number of data blocks for transmission of the data, a number of resource blocks for transmission of the data, a particular modulation scheme, and/or a particular transmission power, among other examples.

To aid the RAN in scheduling, and allocating resources for, transmission of data from a given mobile device on the reverse link, the RAN may evaluate the reverse-link air-interface conditions, or reverse-link quality, of the given mobile device. In order to facilitate this evaluation, mobile devices may be configured to periodically transmit a reverse-link control signal such as a "reverse-link pilot signal" in CDMA or a "sounding reference signal" (SRS) in LTE. The reception quality of the reverse-link control signal may be used by the RAN to help evaluate reverse-link air-interface conditions. In practice, each mobile device operating in a base station's coverage area may be arranged to transmit its reverse-link control signal to the base station at a predetermined time, so that the base station can evaluate the signal at that time. Further, in some implementations, all or multiple mobile devices in a coverage area may be arranged to transmit their reverse-link control signals at the same time, possibly across the full bandwidth of the coverage area.

OVERVIEW

As a general matter, transmission of multiple reverse-link control signals concurrently in a coverage area, particularly across the bandwidth of the coverage area, may result in an undesirable level of interference on the reverse link.

Disclosed herein is a method and system for dynamically controlling the transmission of reverse-link control signals to help reduce interference on the reverse link. According to the disclosure, the RAN may help reduce interference on the reverse link at a given time by reducing the number of mobile devices that transmit a reverse-link control signal at the given time. More particularly, the RAN identifies a mobile device whose transmission of reverse-link control signals best represents the reverse-link air interface condition of each other mobile device in a plurality of mobile devices. Then the RAN causes each mobile device in the plurality other than the identified mobile device to not send its respective reverse-link control signal at the given time, thereby reducing the number of mobile devices that transmit reverse-link control signals at the given time. Thereafter, the RAN may treat reverse-link control signals transmitted by the identified mobile device as representative of air interface conditions for each mobile device in the plurality, and may assign resources (such as any of those described above) to the mobile devices based on the representative reverse-link control signal.

In one respect, for instance, disclosed is a method of managing reverse-link control signal transmission from a plurality of mobile devices served by a RAN. The method may involve the RAN determining, for each mobile device in the plurality, a measure of how well a reverse-link control signal transmitted from the mobile device represents reverse-link air interface conditions of each other mobile device in the plurality. In turn, the method may further involve identifying the given mobile device whose determined measure is the best, and the method may then involve the RAN causing each mobile device in the plurality other than the identified mobile device to not send the reverse-link control signal at one or more predetermined times.

In practice, before the RAN performs any of the functions described above, the RAN may first select each mobile device for inclusion in the plurality of mobile devices. As a general matter, the mobile devices may be selected based on a location of each mobile device. More particularly, the RAN may select, for inclusion in the plurality, mobile devices that are sufficiently closely located to one another so as to increase the likelihood that a reverse-link control signal transmitted by a given mobile device is representative of the air interface conditions of each other mobile device. Thus, the RAN may select each mobile device based on a determination that the location of each mobile device is within a threshold distance from the location of each other mobile device.

Further, the RAN may determine the measure of how well the reverse-link control signal transmitted from a given mobile device represents reverse-link air interface conditions of each other mobile device in the plurality using any suitable approach. One particular approach to determining the measure may involve the RAN first allocating reverse-link resources to other mobile devices in the plurality based on the reverse-link control signal transmitted by the given mobile device. For instance, the RAN may determine, based on the reverse-link control signal transmitted from the given mobile device, an extent of a reverse-link resource (e.g., a number of data blocks, a number of timeslots, a number of resource blocks, a modulation scheme, and/or a transmission power, among other examples). The RAN may then cause at least one other mobile device in the plurality to transmit data to the RAN using the determined extent of the reverse-link resource. Next, the RAN may determine, based on a respective error rate of the data transmitted to the RAN using the determined extent of the reverse-link resource, the measure. The RAN may carry out this process for each mobile device in the plurality, and the RAN may identify the mobile device having the reverse-link control signal associated with the lowest error rate(s) to be the mobile device having a reverse-link control signal that best represents air-interface conditions for each other mobile device.

Further still, after causing each mobile device in the plurality other than the identified mobile device to not send the reverse-link control signal at the given time, the RAN may assign reverse-link resources to mobile devices in the plurality based on the reverse-link control signal transmitted by the identified mobile device. This may involve the RAN determining, based on the reverse-link control signal transmitted by the identified mobile device, an extent of the reverse-link resource. (This determination may be the same determination of the extent of the reverse-link resource made when determining the measure of how well the reverse-link control signal transmitted from the identified mobile device represents reverse-link air interface conditions of each other mobile device in the plurality; alternatively, this determination may be an additional, separate, determination.) The RAN may then cause at least one mobile device in the plurality other than the identified mobile device to transmit data to the RAN using the determined extent of the reverse-link resource. In this way, the RAN may use the reverse-link control signal of the identified mobile device as representative of reverse-link air-interface conditions for each other mobile device in the plurality to facilitate scheduling of reverse-link transmissions by each such other mobile device.

In another respect, disclosed is a RAN for use in a wireless communication system. The RAN may comprise a wireless-communication interface, a processor, and data storage comprising program instructions executable by the processor to dynamically control the transmission of reverse-link control signals to help reduce interference on the reverse link.

Accordingly, as with the method discussed above, the data storage of the RAN may store program instructions for managing reverse-link control signal transmission from the mobile devices served by the RAN. The program instructions may include instructions for determining, for each mobile device in the plurality, a measure of how well a reverse-link control signal transmitted from the mobile device represents reverse-link air interface conditions of each other mobile device in the plurality. In turn, the program instructions may further include instructions for identifying the given mobile device whose determined measure is the best, and instructions for causing each mobile device in the plurality other than the identified mobile device to not send the reverse-link control signal at one or more predetermined times.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

Figure 1:
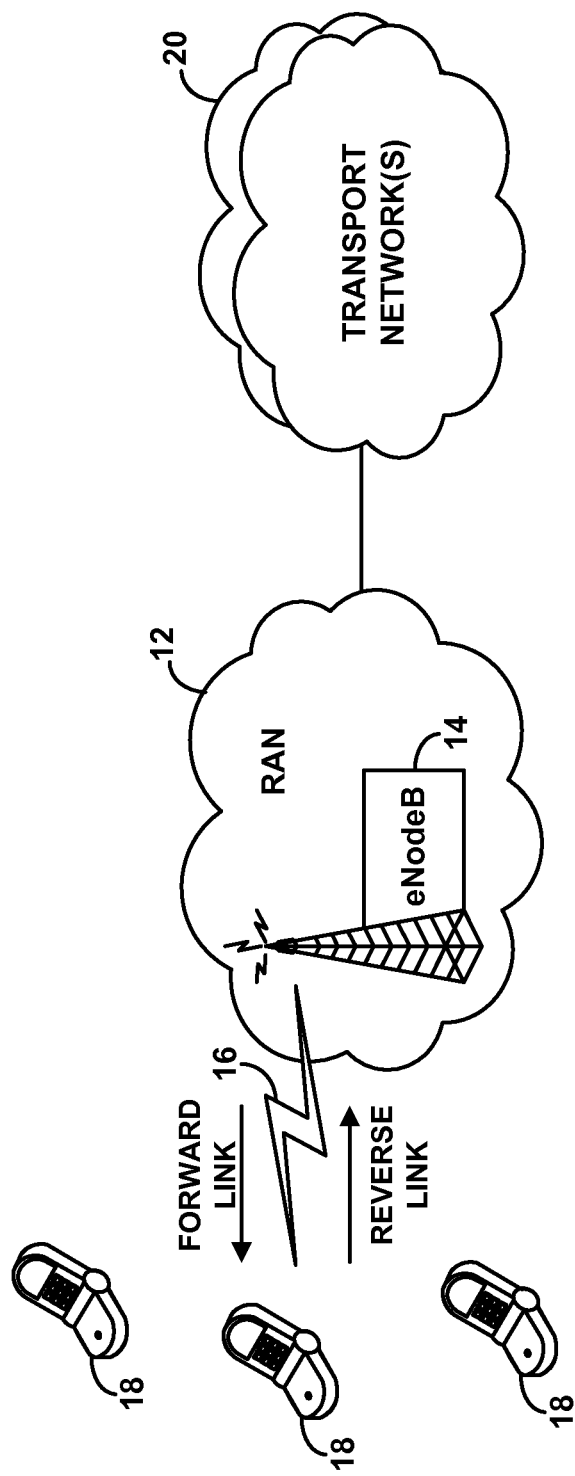
FIG. 1 is a simplified block diagram of a wireless communication system in which the present method can be implemented.

Referring to the drawings, as noted above, FIG. 1 is a simplified block diagram of a wireless communication system in which the present method can be implemented. For purposes of illustration, FIG. 1 may be understood to represent an example network architecture that may be used in an LTE system.

It should be understood, however, that this and other arrangements described herein are set forth only as examples. Indeed, it should be understood that other network architectures could be used. In particular, while for simplicity the examples described herein focus specifically on implementation in an LTE arrangement, other network arrangements and/or air interface protocols (including CDMA, WiMAX, IDEN, GSM, GPRS, UTMS, EDGE, MMDS, WIFI, BLUETOOTH, and other protocols now known or later developed) may be used as well. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

FIG. 1 depicts the example communication system as including at its core a RAN 12 having at least one eNodeB 14 that radiates to define a wireless air interface 16 through which the eNodeB may communicate with one or more served mobile devices 18. As noted above, mobile devices 18 could be wireless telephones, wireless e-mail devices, wirelessly-equipped computers (such as handheld, tablet, or laptop computers), or other types of wireless communication devices. In an example LTE embodiment, the wireless communication between eNodeB 14 and mobile devices 18 may involve orthogonal frequency-division multiplexed (OFDM) signals on both the forward link and the reverse link.

RAN 12 provides connectivity with one or more transport networks 20, such as the public switched telephone network (PSTN) or the Internet for instance. With this arrangement, a mobile device 18 that is positioned within the coverage area of eNodeB 14 and that is suitably equipped may engage in air interface communication with eNodeB 14 and may thereby communicate with remote entities on the transport network(s) and/or with other mobile devices served by RAN 12.

Figure 2:
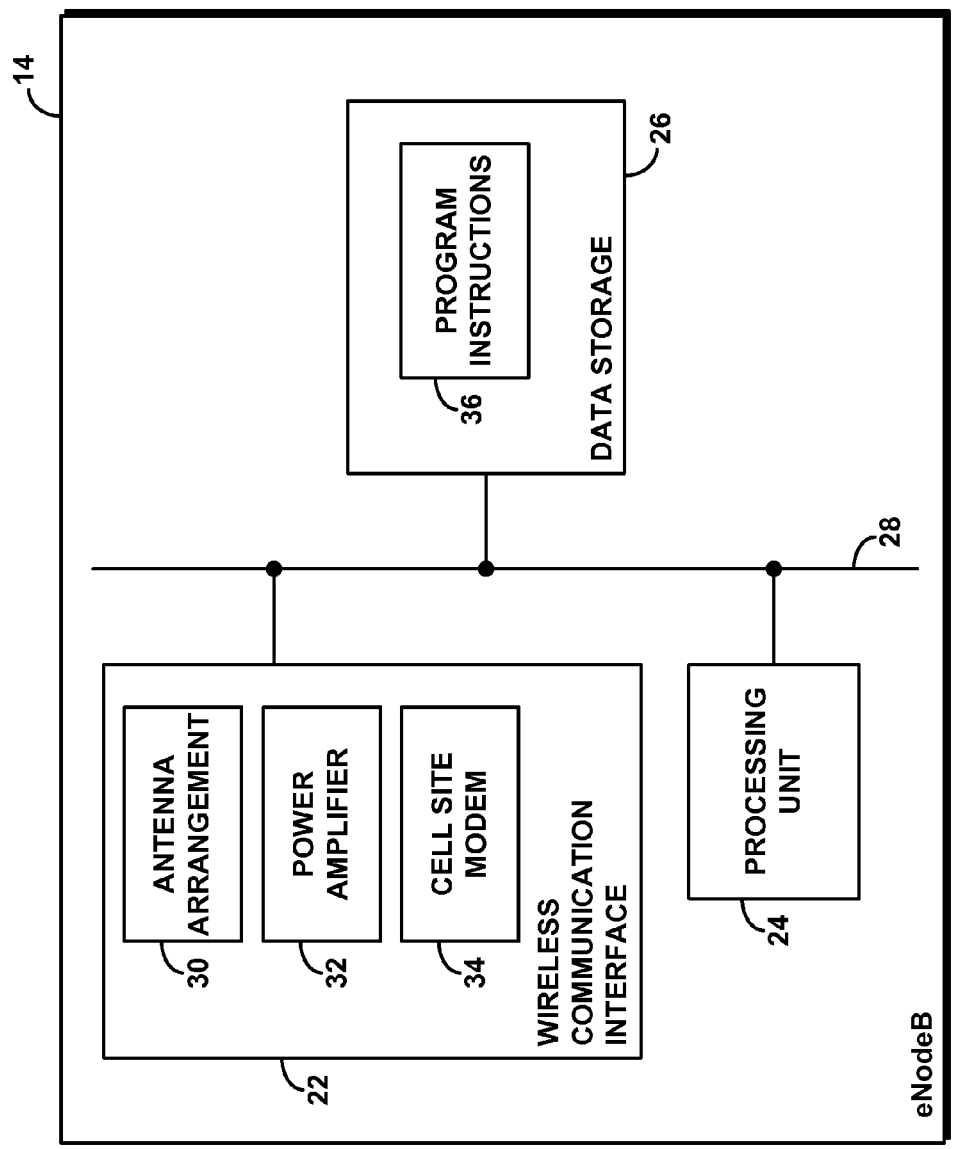
FIG. 2 is a simplified block diagram of an eNodeB operable in the arrangement of FIG. 1.

FIG. 2 is a simplified block diagram of a representative eNodeB 14, (which may also be a base transceiver station, access node, or access point, in other network arrangements, for instance), illustrating some of the components that can be included in such an entity. As shown in FIG. 2, the representative eNodeB may include a wireless communication interface 22, a processing unit 24, and data storage 26, all of which may be coupled together by a system bus, network or other connection mechanism 28.

As shown, wireless communication interface 22 may comprise an antenna arrangement (i.e., antenna structure) 30, which may be tower mounted, and associated components such as a power amplifier 32 and a cell site modem 34 for engaging in air interface communication with mobile devices 18 via the antenna arrangement 30, so as to transmit data and control information to mobile devices 18 and receive data and control information from mobile devices 18. In practice, the eNodeB may allocate various air interface resources for transmission of data from eNodeB 14 to mobile devices 18 on the forward link, and/or from mobile devices 18 to eNodeB 14 on the reverse link.

Processing unit 24 may comprise one or more general purpose processors (e.g., microprocessors) and/or special-purpose processors (e.g., digital signal processors and/or application specific integrated circuits) and may be integrated in whole or in part with the wireless communication interface. And data storage 26 may comprise one or more volatile and/or non-volatile storage components, such as magnetic, optical, flash, or other types of non-transitory computer readable media, and may be integrated in whole or in part with processing unit 24.

As shown, data storage 26 may hold (have encoded thereon) program instructions 36, which may be executable by processing unit 24 to carry out various eNodeB or RAN functions described herein, and specifically to cause the eNodeB to carry out such functions. For instance, in accordance with the program instructions, the processing unit may function to determine, for each mobile device in a plurality of mobile devices served by eNodeB 14, a measure of how well a reverse-link control signal transmitted from the mobile device represents reverse-link air interface conditions of each other mobile device in the plurality. In turn, the processing unit may identify the given mobile device whose determined measure is the best. And further, the processing unit may then have the eNodeB transmit control signaling that causes each mobile device in the plurality other than the identified mobile device to not send the reverse-link control signal at a given time.

As such, the processing unit 24 programmed with instructions 36 may define part or all of a controller for controlling operation of the eNodeB 14. Alternatively or additionally, however, such control functionality could be provided external to the eNodeB 14, in another RAN entity such as by a RAN or eNodeB control entity (for instance, a mobility management entity (MME) in an example LTE arrangement), which may be communicatively linked with the eNodeB and may serve to control certain aspects of eNodeB operation and/or RAN operation generally.

Figure 3:
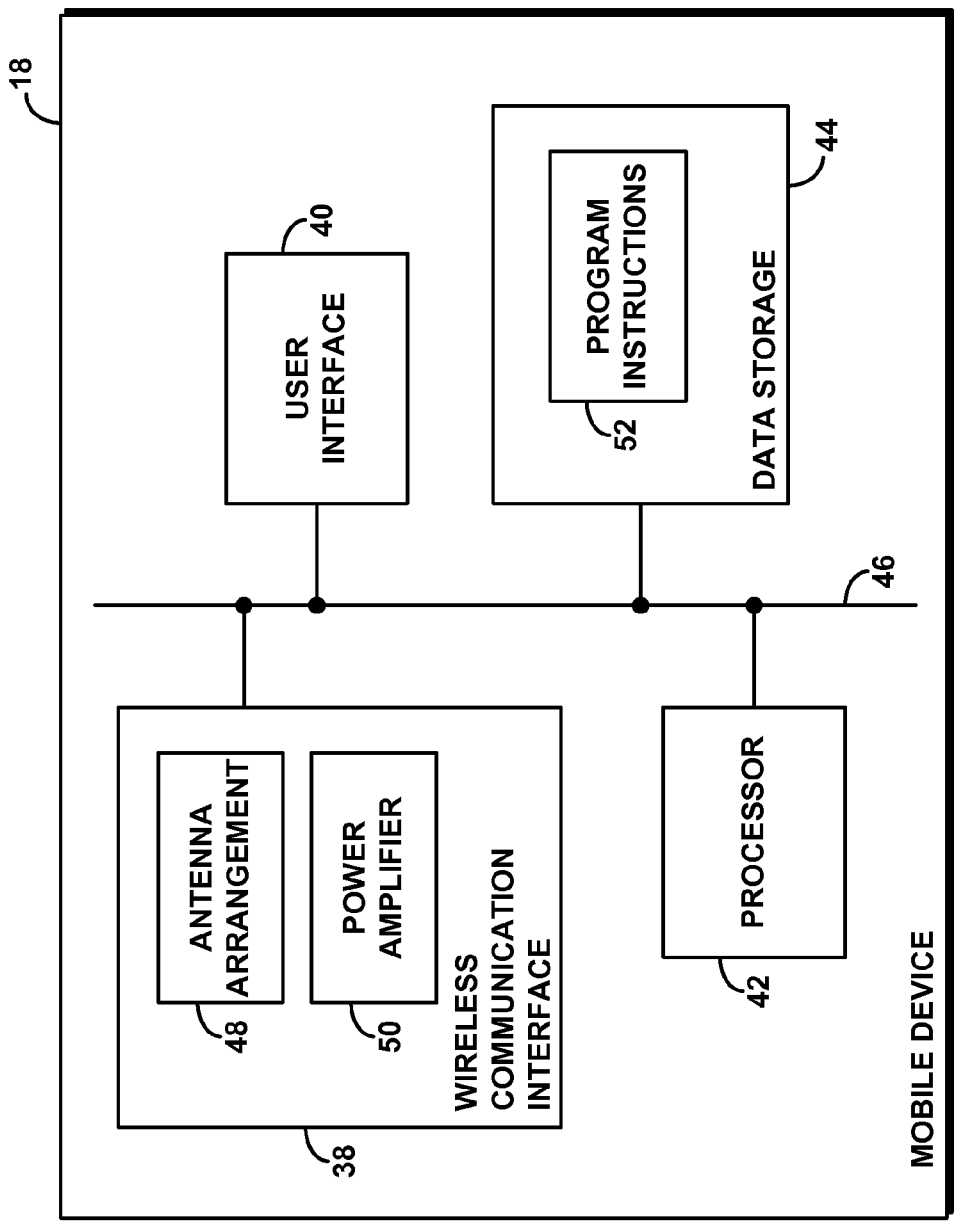
FIG. 3 is a simplified block diagram of a mobile device operable in the arrangement of FIG. 1.

FIG. 3 is next a simplified block diagram of a representative mobile device 18, illustrating some of the components that can be included in such a device. As shown, the representative mobile device may include a wireless communication interface 38, a user interface 40, a processor 42, and data storage 44, all of which may be coupled together by a system bus, network, or other connection mechanism 46.

Wireless communication interface 38 may comprise an antenna arrangement 48 and associated components such as a mobile device modem for instance, for engaging in communication with serving eNodeBs such as eNodeB 14, such as to transmit data and control information to the eNodeBs and to receive data and control information from the eNodeBs. Further, wireless communication interface 36 may include or be interconnected with a power amplifier 50 that controls the power of air interface transmissions via the antenna arrangement 48.

User interface 40 may facilitate interaction with a user of the mobile device if applicable. As such, the user interface may include output components such as a display screen, loudspeaker, and headphone jack, and input components such as a keypad, a touch-sensitive screen, and a camera. Other examples of user-interface components may exist as well.

Processor 42 may then comprise one or more general purpose processors and/or special-purpose processors and may be integrated in whole or in part with wireless communication interface 38. And data storage 44 may comprise one or more volatile and/or non-volatile storage components and may be integrated in whole or in part with processor 42.

As shown, data storage 44 may hold program instructions 52, which may be executable by processor 42 to carry out various mobile device functions described herein. For instance, in accordance with the program instructions, processor 42 may function to receive control signaling from eNodeB 14 that indicates that mobile device 18 should or should not transmit a reverse-link control signal at a given time, and to responsively transmit or not transmit the reverse-link control signal at the given time.

As discussed above, and as shown in FIG. 1, the air interface defines a forward link and a reverse link. Depending on the protocol, these links may be structured in various ways. At a high level, for instance, eNodeB 14 may provide service on one or more frequency channels or bands, with forward-link communications occupying one band and reverse-link communications occupying another band. Alternatively, forward-link and reverse-link communications may be carried out on a common frequency band and may be differentiated through time division multiplexing and/or other techniques.

The forward link and/or reverse link may be divided over time into a sequence of timeslots for carrying data such as bearer traffic and/or control signaling (among perhaps other segments of time set aside for other purposes). The particular sequence, and type, of timeslots may vary according to the particular protocol implemented on the air interface.

Figure 4A:
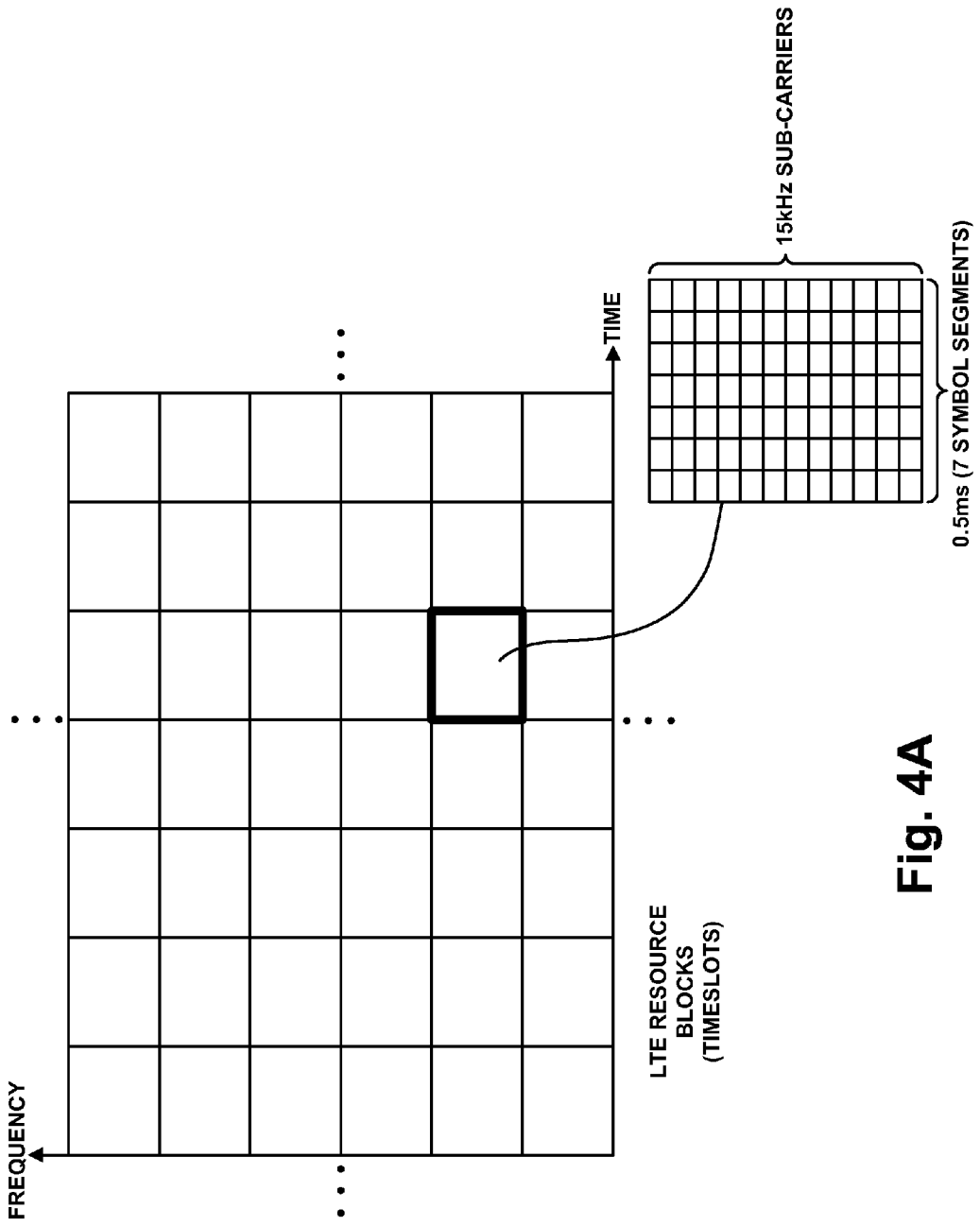
FIG. 4 (parts A and B) is a depiction of reverse-link timeslots in an example implementation.

FIG. 4 (parts A and B) depicts an example timeslot arrangement according to LTE (as defined by the $3^{rd}$ Generation Partnership Project (3GPP) for instance). With particular reference to FIG. 4A, in LTE, the reverse link (and/or forward link) may span a particular frequency bandwidth (such as 5 MHz, 10 MHz, or 20 MHz for instance) that is divided into sub-carriers of 15 kHz, and the reverse link (and/or forward link) may be divided over time into a sequence of 0.5 millisecond timeslots. In turn, every 0.5 millisecond timeslot may define a certain number of 12-subcarrier wide "resource blocks" across the frequency bandwidth (e.g, as many as would fit within the given frequency bandwidth). With particular reference to FIG. 4B, each resource block may then be further divided over time into seven symbol segments of 71 microseconds each, with a certain number of the symbol segments typically being set aside to carry control information and the remainder being set aside to carry bearer traffic.

With this arrangement, the resource blocks may themselves be considered to define individual timeslots across the frequency bandwidth. For instance, if 100 resource blocks fit within the available frequency bandwidth, the reverse link may be considered to have essentially 100 timeslots at a time across the frequency bandwidth. Thus, every 0.5 milliseconds may define another 100 timeslots (LTE resource blocks) across the frequency bandwidth.

In general, with this or other air interface protocols, the RAN (e.g., eNodeB) may be arranged to schedule use of timeslots and/or other resources (such as any of those described above) on the reverse link. For instance, if the mobile device has a data packet to transmit, the mobile device may engage in signaling communication with the RAN to request the RAN to allocate reverse-link timeslots and/or other resources (such as any of those described above) that the mobile device may ultimately use to transmit the data. The RAN may responsively allocate such resources, and the mobile device may then transmit the data using the allocated resources.

Further, as discussed above, the RAN may allocate timeslots and/or other resources based on air-interface conditions. For instance, the mobile device may transmit a reverse-link control signal (e.g., an SRS in LTE arrangements) that is used by the eNodeB to estimate the quality of the air interface for the mobile device. The mobile device may transmit the SRS at a predetermined time, within a symbol segment set aside to carry SRS signaling. For instance, in accordance with the example shown in FIG. 4B, the mobile device may transmit the SRS during the last symbol segment of the scheduling block made up of SLOT 0 and SLOT 1.

As noted above, in some implementations, all mobile devices (or at least multiple of the mobile devices) within a coverage area of a RAN may be arranged to transmit a respective reverse-link control signal to the RAN. In accordance with the particular example described above with respect to FIG. 4, for instance, in a usual LTE implementation all mobile devices may transmit a respective SRS at the same time— during the last symbol segment of each scheduling block. Further, each mobile device may transmit its SRS across the entire bandwidth of the reverse link so that the RAN will be able to approximate the air-interface quality for each mobile device across all available frequencies. But the bandwidth-wide transmission of SRS by each mobile device at the same time may give rise to a problematic level of interference on the reverse link. The example method described herein may help to address this potential problem.

Figure 5:
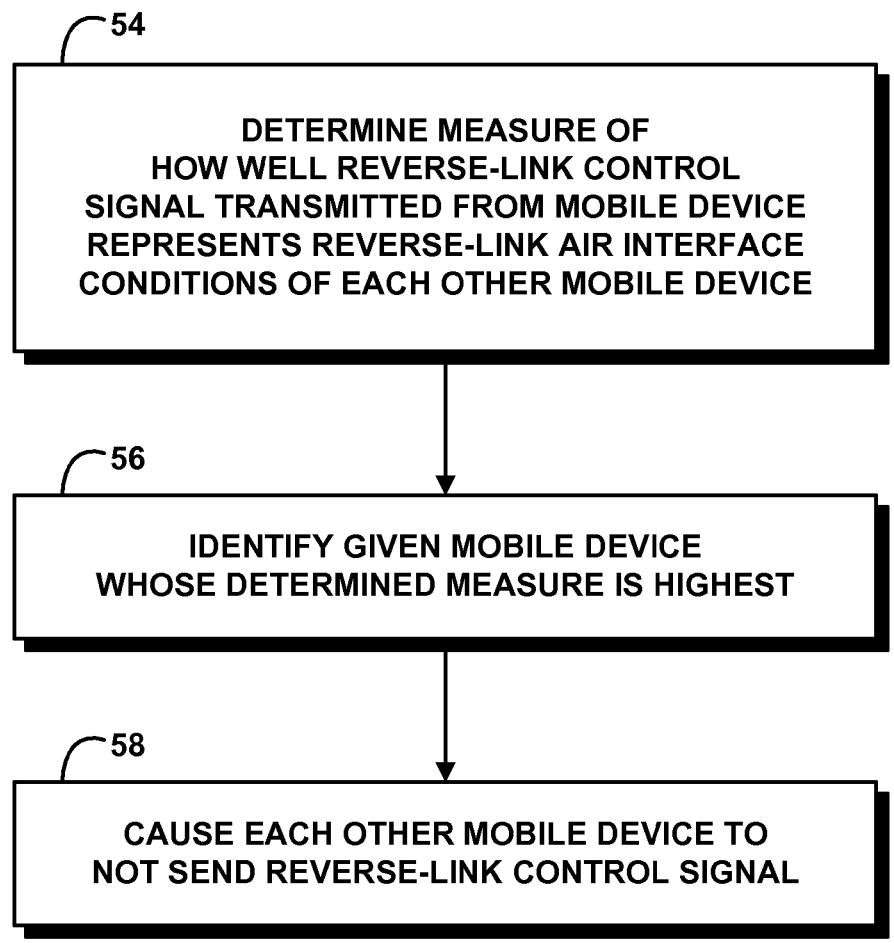
FIG. 5 is a flow chart depicting functions that can be carried out in accordance with the present method.

FIG. 5 is a flow chart illustrating the example method, according to an example embodiment. The example method illustrated in FIG. 5 may be carried out by a RAN that initially provides service to a plurality of mobile devices over an air interface. As a result of carrying out the method, the RAN may help reduce interference on the reverse link in the coverage area served by the RAN.

The example method involves, as shown at block 54, the RAN determining, for each mobile device in the plurality, a measure of how well a reverse-link control signal transmitted from the mobile device represents reverse-link air interface conditions of each other mobile device in the plurality. As shown at block 56, the RAN then identifies, from the plurality of mobile devices, a given mobile device whose determined measure is the best. And, as shown at block 58, the RAN then causes, based on the identification of the given mobile device, each other mobile device in the plurality to not send the reverse-link control signal at one or more predetermined times. Various functions associated with these representative blocks of FIG. 5 are further explained below.

For purposes of explanation of the example method illustrated in FIG. 5, consider one implementation of the example method involving a first mobile device A and a second mobile device B that make up a plurality of mobile devices with respect to which the example method may be carried out. Note that this particular implementation is set forth for purposes of explanation only, and that the example method described herein may be applied to any suitable number of mobile devices.

As a general matter, according to the example method described herein, the RAN may determine both a measure of how well a reverse-link control signal transmitted from mobile device A represents reverse-link air interface conditions of mobile device B, and also a measure of how well a reverse-link control signal transmitted from mobile device B represents reverse-link air interface conditions of mobile device A. The RAN determining the measure for each mobile device may take various forms, and the RAN may determine the measure in any suitable manner. However, for purposes of explanation, FIG. 6 illustrates one particular approach to determining the measure.

Figure 6:
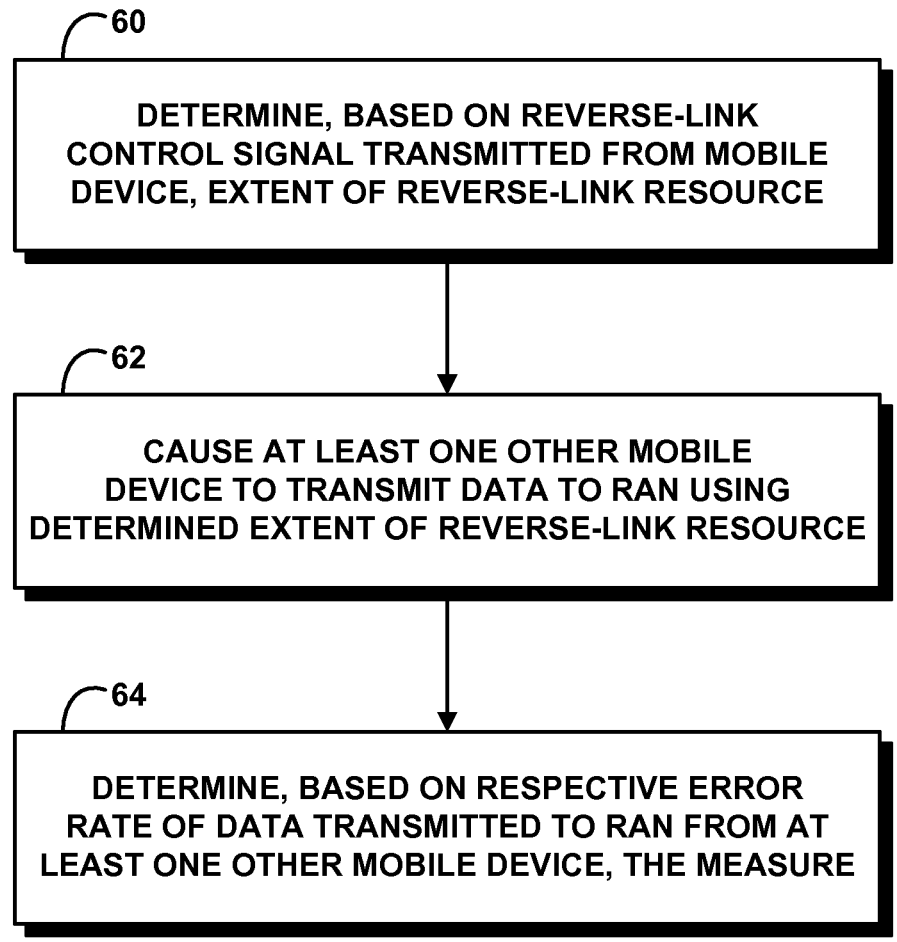
FIG. 6 is another flow chart depicting additional functions that can be carried out in accordance with the present method.

The approach to determining the measure illustrated by FIG. 6 may involve, as shown at block 60, the RAN determining, based on the reverse-link control signal transmitted from the mobile device, an extent of a reverse-link resource. As shown at block 62, the RAN then causes at least one other mobile device in the plurality to transmit data to the RAN using the determined extent of the reverse-link resource. And, as shown at block 64, the RAN determines, based on a respective error rate of the data transmitted to the RAN from the at least one other mobile device, the measure.

Thus, with respect to the implementation involving mobile device A and mobile device B, the RAN may first determine a measure of how well a reverse-link control signal transmitted from mobile device A represents reverse-link air interface conditions of mobile device B. For instance, the RAN may determine, based on the reverse-link control signal transmitted from mobile device A, a reverse-link transmission power (among other possible extents of reverse-link resources, as discussed above). Then, the RAN may cause mobile device B to transmit data to the RAN using the reverse-link transmission power that the RAN determined based on the reverse-link control signal transmitted by mobile device A. The RAN may cause mobile device B to do so using, for example, control-channel signaling on the forward link. Then, the RAN may evaluate the error rate of the data transmitted to the RAN by mobile device B, where mobile device B transmits the data using the reverse-link transmission power that the RAN determined based on the reverse-link control signal transmitted by mobile device A. The RAN may then use the error rate as the measure of how well the reverse-link control signal transmitted from mobile device A represents reverse-link air interface conditions of mobile device B.

Correspondingly, the RAN may then determine a measure of how well a reverse-link control signal transmitted from mobile device B represents reverse-link air interface conditions of mobile device A. For instance, the RAN may determine, based on the reverse-link control signal transmitted from mobile device B, a reverse-link transmission power (among other possible extents of reverse-link resources, as discussed above). As a general matter, the reverse-link resource for which the RAN determines an extent of the resource may be the same for both mobile device B and mobile device A. Then, the RAN may cause mobile device A to transmit data to the RAN using the reverse-link transmission power that the RAN determined based on the reverse-link control signal transmitted by mobile device B. The RAN may cause mobile device A to do so using, for example, control-channel signaling on the forward link. Then, the RAN may evaluate the error rate of the data transmitted to the RAN by mobile device A, where mobile device A transmits the data using the reverse-link transmission power that the RAN determined based on the reverse-link control signal transmitted by mobile device B. The RAN may then use the error rate as the measure of how well the reverse-link control signal transmitted from mobile device B represents reverse-link air interface conditions of mobile device A.

The respective error rate(s) referred to above may be any suitable measure of the quality, amount, or percentage, for example, of the data transmitted to, and received by, the RAN. For example, the error rate may be any one of a (i) a respective bit error rate, (ii) a respective frame error rate, and (iii) a respective packet error rate. Other examples of the error rate may exist as well.

Further, according to the example method, where the plurality of mobile devices includes more than two mobile devices (e.g., one or more mobile devices other than mobile device A and mobile device B), the RAN determining the measure may involve the RAN determining the measure based on an average of the respective error rates of the data transmitted to the RAN from the two or more mobile devices other than the identified mobile device. For instance, in continuing with the above example, consider a situation where both mobile device B and an additional mobile device C transmit data using the reverse-link transmission power that the RAN determined based on the reverse-link control signal transmitted by mobile device A. In such a situation, the RAN may take the measure of how well the reverse-link control signal transmitted from mobile device A represents reverse-link air interface conditions of both mobile device B and mobile device C to be the average of the error rates of data transmitted to the RAN from mobile device B and mobile device C using the reverse-link transmission power that the RAN determined based on the reverse-link control signal transmitted by mobile device A.

Further still, with reference again to an implementation involving a plurality of mobile devices including only mobile device A and mobile device B, the respective reverse-link control signal transmitted from mobile device A and mobile device B may be a reverse-link control signal that is transmitted at a predetermined time in the normal course of operation under a given air interface protocol. For instance, in an LTE implementation, the respective reverse-link control signal may be an SRS transmitted during the last symbol segment of the scheduling block made up of SLOT 0 and SLOT 1 as described above with respect to FIG. 4B. Alternatively, however, the reverse-link control signal need not be transmitted at a predetermined time. Instead, the RAN may cause either, or both, of mobile device A and mobile device B to transmit a respective reverse-link control signal at any suitable time, perhaps via control-channel signaling on the forward link. One advantage of the RAN causing only one mobile device to transmit a respective SRS at a given time is that, under such an approach, total interference on the reverse link will be reduced during the given time. As a result, the RAN may be able to more accurately assess reverse-link air-interface conditions for the mobile device that transmits an SRS at the given time.

According to the example method, the RAN identifying, from the plurality of mobile devices, a given mobile device whose determined measure is the best, as shown by block 56, may take various forms. As noted above, the RAN may take the measure to be the error rate of the respective data transmitted to the RAN from the mobile devices. However, there may be other suitable measures as well.

The RAN identifying the mobile device whose determined measure is the best may involve the RAN identifying the mobile device associated with the smallest error rate. For instance, in continuing with the implementation involving mobile device A and mobile device B discussed above, the RAN may identify, from among mobile device A and mobile device B, the mobile device that has the best determined measure of how well the mobile device's reverse-link control signal represents the reverse-link air interface conditions of the other mobile device. For example, if the error rate of the data transmitted to the RAN by mobile device B when using the reverse-link transmission power that the RAN determined based on the reverse-link control signal transmitted by mobile device A is less than the error rate of the data transmitted to the RAN by mobile device A when using the reverse-link transmission power that the RAN determined based on the reverse-link control signal transmitted by mobile device B, then the RAN may identify mobile device A as having the best determined measure. On the other hand, if the error rate of the data transmitted to the RAN by mobile device A when using the reverse-link transmission power that was determined based on the reverse-link control signal transmitted by mobile device B is less than the error rate of the data transmitted to the RAN by mobile device B when using the reverse-link transmission power that the RAN determined based on the reverse-link control signal transmitted by mobile device A, then the RAN may identify mobile device B as having the best determined measure.

In turn, the RAN causing each mobile device in the plurality other than the identified mobile device to not send the reverse-link control signal at one or more predetermined times, as shown by block 58, may also take various forms. As a particular example in accordance with an LTE arrangement, the RAN may cause each other mobile device to not send the SRS during the SRS symbol segment described above with respect to FIG. 4B. Thus, in continuing with the implementation involving mobile device A and mobile device B discussed above, for instance, if the RAN identifies mobile device A, the RAN may cause mobile device B to not send its SRS during the SRS symbol segment. On the other hand, if the RAN identifies mobile device B, the RAN may cause mobile device A to not send its SRS during the SRS symbol segment.

Note that the RAN may use any suitable control signal and/or instruction transmitted on the forward link to cause the respective mobile devices to not send (or to send) the reverse-link control signal, as will be understood by those having ordinary skill in the art. For instance, the RAN may send to the mobile device a particular directive that indicates that the mobile device should not, or should, send a reverse-link control signal at a particular time. Correspondingly, the mobile device, such as example mobile device 18, may include program instructions 52 stored in data storage 44 that interpret such a directive as a command to not send, or to send, the reverse-link control signal at the particular time. Thus, program instructions 52 may cause mobile device 18 to not send, or to send, the reverse-link control signal at the particular time.

As discussed above, once the RAN causes mobile devices other than the identified mobile device to not send their respective reverse-link control signal, the RAN may treat reverse-link control signals transmitted by the identified mobile device as representative of air interface conditions of each mobile device in the plurality. Accordingly, the RAN may allocate resources to all mobile devices in the plurality based on the representative reverse-link control signal received from the identified mobile device.

Thus, the RAN may also determine, based on the reverse-link control signal transmitted by the identified mobile device, an extent of a reverse-link resource for allocation to other mobile devices in the plurality. Note that this determination may be the same determination of the extent of the reverse-link resource made when determining the measure of how well the reverse-link control signal transmitted from the identified mobile device represents reverse-link air interface conditions of each other mobile device in the plurality. Alternatively, this determination may be an additional, separate, determination. In any event, the RAN may then cause at least one mobile device in the plurality other than the identified mobile device to transmit data to the RAN using the determined reverse-link resource. In this way, the RAN may continue to dynamically allocate resources to the mobile devices based on the reverse-link control signal transmitted by the identified mobile device, while, at the same time, helping to reduce reverse-link control signal transmissions (and thus interference) on the reverse link.

As a general matter, it may be desirable to only carry out certain functions described above for a plurality of mobile devices for which there is a reasonable expectation that the air-interface conditions of each mobile device in the plurality are sufficiently similar. Thus, in practice, before the RAN performs any of the functions described above, the RAN may select each mobile device for inclusion in the plurality of mobile devices. And because it is generally the case (though exceptions may exist) that relatively closely-located mobile devices will have more similar air-interface conditions than mobile devices that are not closely located, the RAN may select relatively closely-located mobile devices for inclusion in the plurality. More generally, the RAN may select mobile devices for inclusion in the plurality based on the location of each mobile device. And in a particular implementation, the RAN may select each mobile device for inclusion in the plurality based on a determination that the location of each mobile device is within a threshold distance from the location of each other mobile device.

Figure 7:
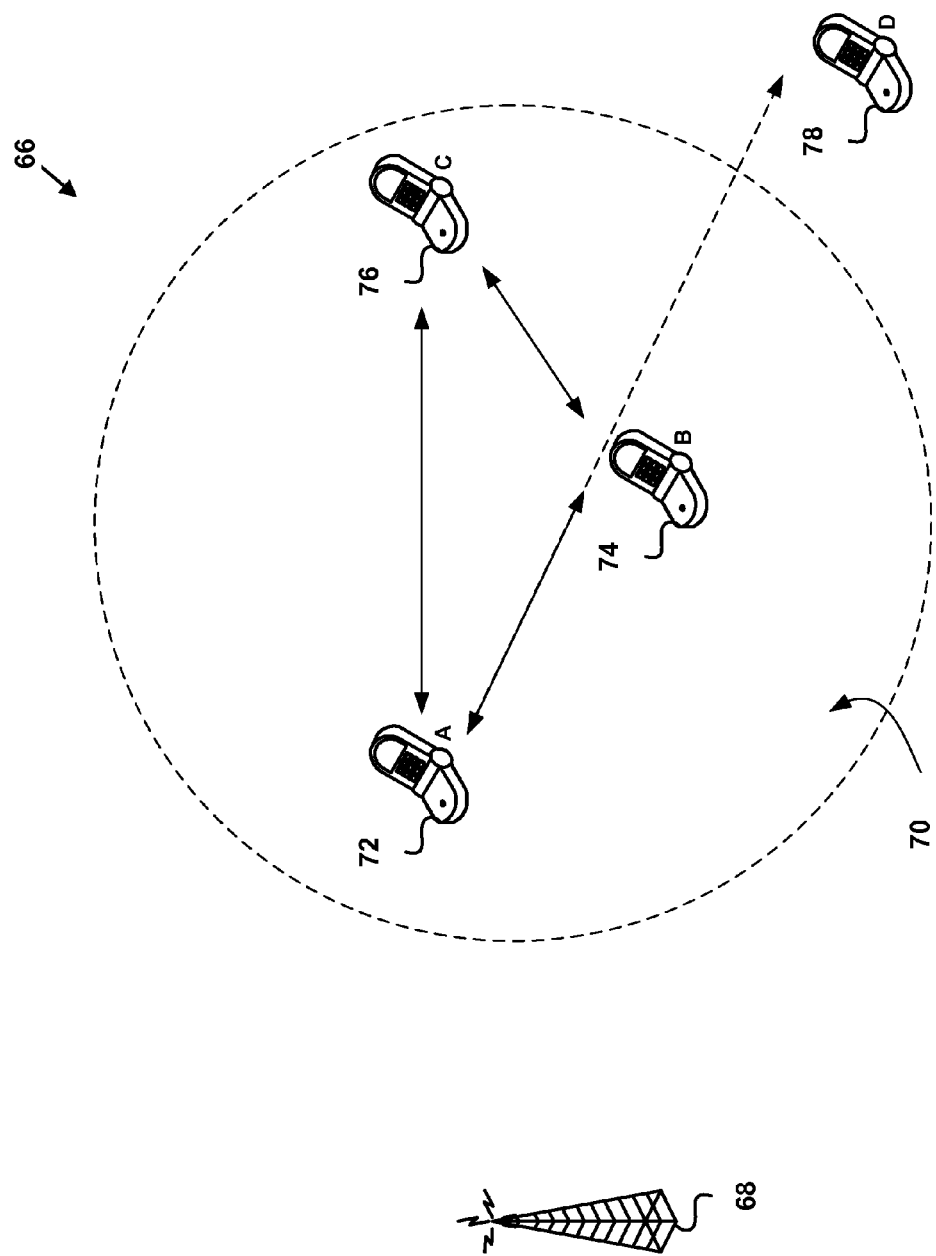
FIG. 7 is a simplified block diagram of a plurality of mobile devices in an example wireless communication network, in accordance with at least one embodiment of the method.

With reference to FIG. 7, for example, a plurality of mobile devices in an example wireless communication system 66 is shown. In wireless communication system 66, eNodeB 68 provides wireless service to mobile devices 72, 74, 76, and 78. eNodeB 68 (and/or the RAN associated with eNodeB 68) may receive, or may otherwise determine, location information that indicates the geographic location of each mobile device. As one example, the RAN may receive such location information from one or more mobile devices via signaling on the reverse link. For instance, a given mobile device may be configured to send a signal that indicates its location to the RAN. As another example, the RAN may receive such location information from a mobile-device-location service provider that is equipped to monitor the location of mobile devices. As yet another example still, the RAN may determine such location information using various triangulation techniques as will be understood by those of ordinary skill in the art. Other sources of location information that indicates the geographic location of mobile devices may exist as well.

To facilitate a determination of whether the location of each mobile device is within a threshold distance from the location of each other mobile device, the RAN may determine, using such location information, each of the distance from location A to B between mobile devices 72 and 74, the distance from location B to C between mobile devices 74 and 76, and the distance from location C to A between mobile devices 76 and 62. Further, in the example shown in FIG. 7, the RAN may determine that each of the distance from location A to B between mobile devices 72 and 74, the distance from location B to C between mobile devices 74 and 76, and the distance from location C to A between mobile devices 76 and 62 is less than a given threshold distance. However, the RAN may also determine that the distance from location A to D between mobile devices 72 and 78 is greater than the given threshold distance. As such, according to the example shown in FIG. 7, the RAN may select mobile devices 72, 74, and 76 for inclusion within the plurality, while the RAN may exclude mobile device 78.

While distances between the mobile devices may be used as a basis for selecting mobile devices for inclusion in the plurality, other bases may be used additionally or alternatively. As one particular example of an alternative basis, the RAN may select each mobile device for inclusion in the plurality based on a determination that each mobile device is within a predefined geographic area. In the particular example shown in FIG. 7, for instance, mobile devices 72, 74, and 76 are each within predefined geographic area 70. However, mobile device 78 is not within predefined geographic area 70. As such, the RAN may select mobile devices 72, 74, and 76 for inclusion within the plurality, while the RAN may exclude mobile device 78.

As a general matter, it may also be desirable to only carry out the functions described above with respect to the example method for a plurality of mobile devices for which there is a reasonable expectation that the air-interface conditions of each mobile device will remain substantially constant. Because it is generally the case that mobile devices that are substantially stationary will not have significantly varying air-interface conditions, the RAN may seek to help ensure that mobile devices included in the plurality are substantially stationary. Thus, as another example of an alternative basis for selecting mobile devices for inclusion in the plurality, the RAN may select for inclusion in the plurality mobile devices having a mobility below a given mobility threshold.

The RAN may evaluate the mobility of a given mobile device based on any unit of measure that is suitable for analyzing the mobility of the given mobile device including, but not limited to, an average speed of the given mobile device, an average acceleration of the given mobile device, and an average displacement of the given mobile device, or a combination of any such measures. The RAN may determine any such measure of the mobility of the given mobile device using any suitable location information corresponding to the given mobile device, such as the location information described above. For example, the RAN may determine the mobility of the given mobile device based at least in part on movement of the given mobile device during a given time period t from a first location to a second location. In such a case, the RAN may be configured to, for example, determine that the given mobile device has a mobility equal to the distance between the first location and the second location, divided by time period t. The RAN may then select the given mobile device for inclusion in the plurality if its determined mobility is below the mobility threshold.

The RAN may select mobile devices based on threshold distances and/or mobility thresholds, as described above, alone or in combination. Thus, for example, the RAN may select each mobile device for inclusion in the plurality based on a determination that the location of each mobile device is within a threshold distance from the location of each other mobile device selected for inclusion in the plurality. And then, before the RAN determines, for each mobile device in the plurality, the measure of how well the reverse-link control signal transmitted from the mobile device represents reverse-link air interface conditions of each other mobile device in the plurality, the RAN may also make a determination that a mobility of each mobile device in the plurality does not exceed a mobility threshold. In this way, the RAN may select for inclusion in the plurality only those mobile devices that both are within a threshold distance from the location of each other mobile device and have a mobility that does not exceed a mobility threshold.

As a general matter, the RAN may repeat the functions described above with respect to the example method at any suitable time, for example, either periodically or at other various predetermined times. By doing so, the RAN may dynamically change (when necessary) its selection of the plurality of mobile devices and/or its identification of which mobile device transmits reverse-link control signals that best represent reverse-link air interface conditions of other mobile devices in the plurality. In other words, after causing the mobile devices other than the initially identified mobile device to not send the reverse-link control signal, the RAN may attempt to ensure that it remains beneficial to not have mobile devices other than the initially identified mobile device transmit the reverse-link control signal. If it appears it may no longer be beneficial to have a particular mobile device not transmit its reverse-link control signal, the RAN may decide to carry out the functions again.

Thus, to help decide when the functions should be carried out again, the RAN may determine one or more aspects of a given mobile device's state (e.g., an error rate of data transmitted by, a location, and/or a mobility of the mobile device, among other examples). Such a determination may be referred to herein as a "mobile-device-state determination."

The RAN may use the mobile-device-state determination as a basis to decide to carry out (again) the functions described above. For example, if the RAN makes a mobile-device-state determination that a particular mobile device is not within a threshold distance from each other mobile device in the plurality, the RAN may carry out the functions once again. As another example, if the RAN makes a mobile-device-state determination that a mobility of the particular mobile device exceeds a mobility threshold, the RAN may carry out the functions once again. And, as another example still, if the RAN makes a mobile-device-state determination that a respective error rate of data received from a particular mobile device exceeds an error threshold, the RAN may carry out the functions once again.

Any such mobile-device-state determination may be made at any suitable time. In one example, the RAN may wait a predetermined amount of time after the RAN causes each mobile device in the plurality other than the identified mobile device to not send the reverse-link control signal. Then the RAN may, after waiting the predetermined amount of time, make the mobile-device-state determination. Further, the RAN may then make the mobile-device-state determination in a recurring fashion, after recurring periods of the predetermined amount of time, for example.

As part of carrying out (again) the functions described above, the RAN may cause a particular mobile device to send its reverse-link control signal. And in the event that the particular mobile device is not selected for inclusion in the plurality of mobile devices, the RAN may assign reverse-link resources to the particular mobile device based on the reverse-link control signal received from the particular mobile device.

Example embodiments have been described above. It should be understood, however, that variations from these embodiments are possible, while remaining within the true spirit and scope of the invention.

We claim:

1. In a wireless communication system in which a RAN provides service to a plurality of mobile devices over an air interface, a method of managing reverse-link control signal transmission from the mobile devices to the RAN, the method comprising:
    (a) the RAN determining, for each mobile device in the plurality, a measure of how well a reverse-link control signal transmitted from the mobile device represents reverse-link air interface conditions of each other mobile device in the plurality;
    (b) the RAN identifying, from the plurality of mobile devices, a given mobile device whose determined measure is the best; and
    (c) the RAN causing, based on the identification of the given mobile device, each other mobile device in the plurality to not send the reverse-link control signal at one or more predetermined times.

2. The method of claim 1, further comprising:
    (a) the RAN determining, based on the reverse-link control signal transmitted by the identified given mobile device, an extent of a reverse-link resource; and
    (b) the RAN causing at least one mobile device in the plurality other than the identified given mobile device to transmit data to the RAN using the determined extent of the reverse-link resource.

3. The method of claim 2, wherein the determined reverse-link resource comprises one or more of (i) a number of data blocks, (ii) a number of timeslots, (iii) a number of resource blocks, (iv) a modulation scheme, and (v) a transmission power.

4. The method of claim 1, wherein the RAN determining, for each mobile device in the plurality, the measure of how well the reverse-link control signal transmitted from the mobile device represents reverse-link air interface conditions of each other mobile device in the plurality comprises:
    (a) the RAN determining, based on the reverse-link control signal transmitted from the mobile device, an extent of a reverse-link resource;
    (b) the RAN causing at least one other mobile device in the plurality to transmit data to the RAN using the determined extent of the reverse-link resource; and
    (c) the RAN determining, based on a respective error rate of the data transmitted to the RAN from the at least one other mobile device, the measure.

5. The method of claim 4, wherein the respective error rate is one of a (i) a respective bit error rate, (ii) a respective frame error rate, and (iii) a respective packet error rate.

6. The method of claim 4, wherein the RAN causes two or more mobile devices in the plurality to transmit data to the RAN using the determined extent of the reverse-link resource, and wherein the RAN determining, based on the respective error rate of the data transmitted to the RAN from the at least one other mobile device, the measure, comprises the RAN determining the measure based on an average of the respective error rates of the data transmitted to the RAN from the two or more other mobile devices.

7. The method of claim 1, further comprising:
before the RAN determines, for each mobile device in the plurality, the measure of how well the reverse-link control signal transmitted from the mobile device represents reverse-link air interface conditions of each other mobile device in the plurality, the RAN selecting each mobile device for inclusion in the plurality of mobile devices based on a location of each mobile device.

8. The method of claim 7, wherein the RAN selecting, based on the location of each mobile device, each mobile device for inclusion in the plurality of mobile devices, comprises the RAN selecting each mobile device for inclusion in the plurality based on a determination that the location of each mobile device is within a threshold distance from the location of each other mobile device.

9. The method of claim 7, wherein the RAN selecting, based on the location of each mobile device, each mobile device for inclusion in the plurality of mobile devices, comprises the RAN selecting each mobile device for inclusion in the plurality based on at least one of (i) location information received from at least one mobile device, (ii) location information received from an mobile-device-location service provider, (iii) location information determined by the RAN.

10. The method of claim 1, further comprising:
before the RAN determines, for each mobile device in the plurality, the measure of how well the reverse-link control signal transmitted from the mobile device represents reverse-link air interface conditions of each other mobile device in the plurality, the RAN making a determination that a mobility of each mobile device in the plurality does not exceed a mobility threshold.

11. The method of claim 1, wherein the reverse-link control signal is one of a sounding reference signal and a reverse-link pilot signal.

12. The method of claim 11, wherein making the mobile-device-state determination comprises:
waiting a predetermined amount of time after the RAN causes each other mobile device in the plurality to not send the reverse-link control signal at at least one predetermined time; and
after waiting the predetermined amount of time, making the mobile-device-state determination.

13. The method of claim 1, further comprising:
after causing, based on the identification of the given mobile device, each other mobile device in the plurality to not send the reverse-link control signal at one or more predetermined times, the RAN making an mobile-device-state determination, wherein the mobile-device-state determination is at least one of (i) a particular mobile device is not within a threshold distance from each other mobile device in the plurality, (ii) a mobility of the particular mobile device exceeds a mobility threshold, and (iii) a respective error rate with respect to data received from the particular mobile device exceeds a threshold error rate; and
in response to making the mobile-device-state determination, the RAN causing the particular mobile device to send the reverse-link control signal.

14. A radio access network (RAN), wherein the RAN provides service to a plurality of mobile devices over an air interface, the RAN comprising:
a wireless-communication interface;
a processor; and
data storage comprising program instructions executable by the processor for causing the RAN to carry out functions including:
(a) determining, for each mobile device in the plurality, a measure of how well a reverse-link control signal transmitted from the mobile device represents reverse-link air interface conditions of each other mobile device in the plurality;
(b) identifying, from the plurality of mobile devices, a given mobile device whose determined measure is the best; and
(c) causing, based on the identification of the given mobile device, each other mobile device in the plurality to not send the reverse-link control signal at one or more predetermined times.

15. The RAN of claim 14, the data storage further comprising instructions for:
(a) determining, based on the reverse-link control signal transmitted by the identified given mobile device, an extent of a reverse-link resource; and
(b) causing at least one mobile device in the plurality other than the identified given mobile device to transmit data to the RAN using the determined extent of the reverse-link resource.

16. The RAN of claim 14, wherein determining, for each mobile device in the plurality, the measure of how well the reverse-link control signal transmitted from the mobile device represents reverse-link air interface conditions of each other mobile device in the plurality comprises:
(a) determining, based on the reverse-link control signal transmitted from the mobile device, an extent of a reverse-link resource;
(b) causing at least one other mobile device in the plurality to transmit data to the RAN using the determined extent of the reverse-link resource; and
(c) determining, based on a respective error rate of the data transmitted to the RAN from the at least one other mobile device, the measure.

17. The RAN of claim 14, the data storage further comprising instructions for:
before determining, for each mobile device in the plurality, the measure of how well the reverse-link control signal transmitted from the mobile device represents reverse-link air interface conditions of each other mobile device in the plurality, selecting each mobile device for inclusion in the plurality of mobile devices based on a location of each mobile device.

18. The RAN of claim 14, the data storage further comprising instructions for:
before determining, for each mobile device in the plurality, the measure of how well the reverse-link control signal transmitted from the mobile device represents reverse-link air interface conditions of each other mobile device in the plurality, making a determination that a mobility of each mobile device in the plurality does not exceed a mobility threshold.

19. The RAN of claim 14, the data storage further comprising instructions for:
after causing, based on the identification of the given mobile device, each other mobile device in the plurality to not send the reverse-link control signal at one or more predetermined times, making an mobile-device-state determination, wherein the mobile-device-state determination is at least one of (i) a particular mobile device is not within a threshold distance from each other mobile device in the plurality, (ii) a mobility of the particular mobile device exceeds a mobility threshold, and (iii) a respective error rate of data received from the particular mobile device exceeds a threshold error rate; and in response to making the mobile-device-state determination, causing the particular mobile device to send the reverse-link control signal.

20. The RAN of claim 19, wherein making the mobile-device-state determination comprises:

waiting a predetermined amount of time after causing each other mobile device in the plurality to not send the reverse-link control signal at at least one predetermined time; and after waiting the predetermined amount of time, making the mobile-device-state determination.

* * * * *